United States Patent [19]

Ogura et al.

[11] Patent Number: 5,105,419
[45] Date of Patent: Apr. 14, 1992

[54] CARRIAGE ASSEMBLY

[75] Inventors: Manabu Ogura; Takashi Yumura; Tetsu Yamamoto, all of Amagasaki, Japan

[73] Assignee: Mitsubishi Denki Kabushiki Kaisha, Japan

[21] Appl. No.: 517,502

[22] Filed: Apr. 30, 1990

Related U.S. Application Data

[63] Continuation of Ser. No. 260,267, Oct. 20, 1988, abandoned.

[51] Int. Cl.⁵ .................... G11B 17/30; G11B 21/02
[52] U.S. Cl. .................... 369/219; 369/218; 369/215
[58] Field of Search ............... 369/247, 220, 219, 221, 369/218, 251, 253, 244, 57, 98, 215; 360/101, 107; 318/135, 254, 695, 696; 389/54, 58

[56] References Cited

U.S. PATENT DOCUMENTS

| | | | |
|---|---|---|---|
| 3,418,435 | 12/1968 | Norris | 369/249 |
| 3,578,340 | 5/1971 | Fortune | 369/249 |
| 4,007,939 | 2/1977 | Iyeta | 369/249 |
| 4,030,123 | 6/1977 | Taylor | 369/253 |
| 4,473,899 | 9/1984 | Miki et al. | 369/249 |
| 4,613,962 | 9/1986 | Inoue | 369/219 |
| 4,740,946 | 4/1988 | Yamura et al. | 369/219 |
| 4,823,336 | 4/1989 | Inada | 369/221 |

FOREIGN PATENT DOCUMENTS

0538527 12/1940 United Kingdom ................ 369/251

*Primary Examiner*—Stuart S. Levy
*Assistant Examiner*—Tan Nguyen
*Attorney, Agent, or Firm*—Leydig, Voit & Mayer

[57] ABSTRACT

A carriage assembly has a carriage provided on both sides with voice coils, a magnet assembly surrounding the voice coils and adapted for causing the carriage to move in the radial direction of a disk, and guide rails for guiding the carriage in the radial direction of the disk. The carriage is provided on a lower portion thereof with first rollers for engagement with the guide rails and at its upper portion thereof with second rollers which co-operate with a biasing members in preventing the carriage from moving upward. Either the guide rails or the first rollers are provided with grooves which prevent the first rollers from moving in the tangential directions of the guide rails. Since the movement of the first rollers in the tangential directions of the guide rail is prevented, it is possible to locate the carriage with a high degree of precision with respect to the disk.

1 Claim, 3 Drawing Sheets

CARRIAGE ASSEMBLY

This application is a continuation of application Ser. No. 07/260,267 filed Oct. 20, 1988 now abandoned.

BACKGROUND OF THE INVENTION

1. Field of the Invention

The present invention relates to a carriage assembly for moving and supporting a moving access type actuator in an apparatus such as an optical disk apparatus.

2. Description of the Prior Art

FIG. 1 is a front elevational sectional view of an example of conventional carriage assembly, while FIG. 2 is a side elevational sectional view of the carriage assembly shown in FIG. 1. In these figures, a carriage 2 is adapted to be moved in the radial direction of a disk 1 which is a recording medium. A pair of first rollers 3 which are inclined to converge upward are disposed under the carriage 2. These first rollers 3 are rotatably provided on a pair of guide rails 5 in the form of round bars fixed to the base 4 and extending in the radial direction of the disk 1. Voice coils 6 having a rectangular cross-section are fixed to both sides of the carriage 2. On the outer side of the voice coil 6, there are magnets 8 which are fixed to the base 4 and adapted for moving the carriage 2 in the radial direction of the disk 1 in co-operation with the voice coil 6. A pair of second rollers 9 are rotatably mounted on both lower portions of the carriage 2. The second rollers 9 are adapted to prevent the carriage 2 from moving upward, in co-operation with the guide plate 10 secured to the base 4.

An actuator base 11 is formed within the carriage 2. The base 11 carries a lens actuator 13 which drives an objective lens 12 so as to locate the same. A light beam 14 from an optical information converter (not shown) is directed to an objective lens 12 through a triangular prism 15 which is disposed immediately under the lens actuator 13.

A description will be given hereinunder of the operation of the carriage assembly. When electrical current is supplied to the voice coil 6, a thrust force acting in the radial direction of the disk 1 (direction of X-axis in FIG. 2) is generated by the interaction between the current flowing in the voice coil 6 and the magnetic lines of force generated by the magnet 8, whereby the carriage 2 moves along the guide rail 5 with the first rollers 3 rotating on the guide rails 5. When the carriage 2 has reached a predetermined position, the electrical power supply to the voice coil 6 is interrupted so that the movement of the carriage 2 in the direction of the X-axis is ceased.

Subsequently, the lens actuator 13 operates to cause a slight movement of the objective lens 12 in the direction perpendicular to the plane of the disk 1, i.e., in the direction of the Z-axis as viewed in FIG. 1, and a light beam 14 from an optical information converter (not shown) is made to impinge upon a predetermined point on the surface of the disk 1 through the triangular prism 15 and the objective lens 12, thereby forming a light spot on the disk 1 so that recording, reproduction or erasure of information is conducted on the disk 1. The first rollers 3 secured to lower portions of the carriage 2 are inclined with respect to each other and are pressed by the guide rails 5, while the second rollers 9 are pressed by the guide plates 10, so that the movement of the carriage 2 is restricted both in the Y- and Z-axis directions. Rotation of the carriage 2 also is prevented about all the axes X, Y and Z.

This known carriage asembly suffers from a problem in that the first roller 3 on the guide rail in the form of a round bar tends to slip in the tangential direction of the guide rail when the pre-load applied to the carriage 2 is changed due to various reasons such as dimensional errors of the constituents such as the first rollers 3, second rollers 9, guide rails 5 and guide plates 10, as well as mounting error of the same. This makes it difficult to reduce the size of the first roller 3 and to precisely locate the light beam 14 with respect to the disk 1.

SUMMARY OF THE INVENTION

Accordingly, an object of the present invention is to provide a carriage assembly which can precisely locate a light beam with respect to a recording medium.

To this end, according to the present invention, there is provided a carriage assembly comprising a base; a carriage movable on the base in the radial direction of a recording medium in the form of a disk; voice coils attached to both sides of the carriage; magnet means provided on the base so as to surround the voice coils for co-operating with the voice coils in moving the carriage in the radial direction of the disk; guide rail means fixed to the base so as to extend in the radial direction of the disk thereby to guide the carriage in the radial direction of the disk; a plurality of first rollers rotatably secured to a lower portion of the carriage and engaging with the guide rail means; second rollers secured to both sides of an upper portion of the carriage; biasing means contacting the second rollers and co-operating with the second rollers in limiting upward movement of the carriage; and groove means provided in the guide rails or in the first rollers so as to prevent the first rollers from moving in the tangential directions of the guide rails.

According to this arrangement, since grooves are formed in the first bearings or in the guide rails, the undesirable slipping of each first bearing on the associated guide rail in the tangential direction thereof is prevented, thus ensuring a high degree of locating precision.

Furthermore, the requirement for dimensional precision of the guide rails and the second rollers, as well as the required mounting precision are decreased. In addition, as the rotation in the direction of movement of the carriage is prevented.

DESCRIPTION OF THE PREFERRED EMBODIMENTS

Figure 4:
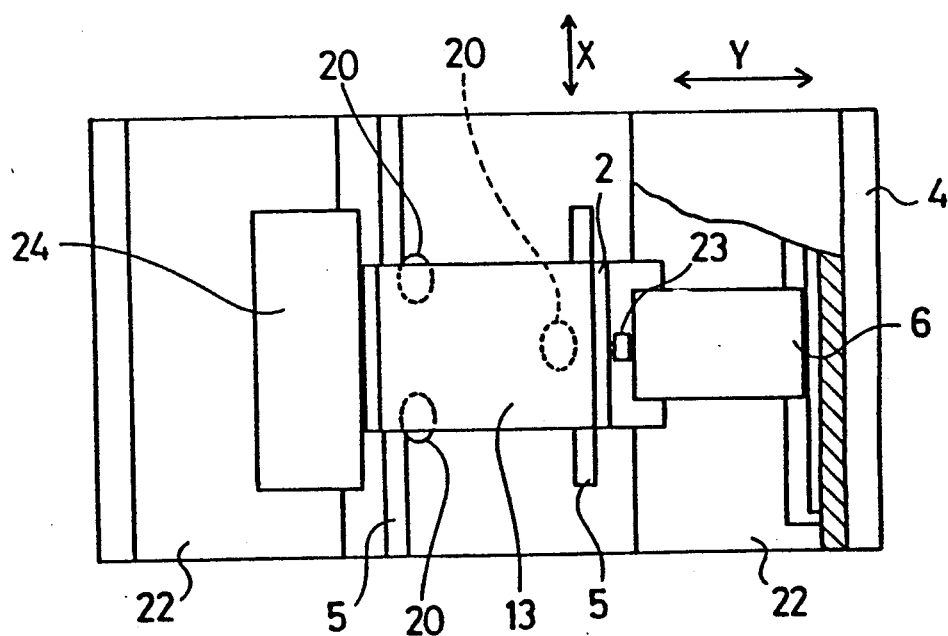
FIG. 4 is a fragmentary sectional plan view of the embodiment shown in FIG. 3.
Figure 5:
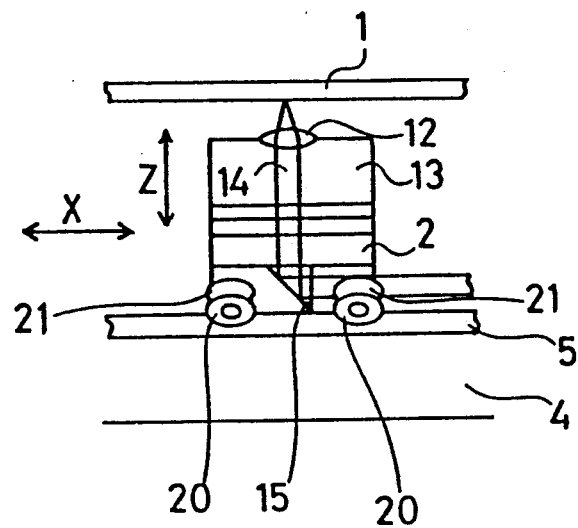
FIG. 5 is a side elevational sectional view of the embodiment shown in FIG. 3.

A preferred embodiment of the present invention will be described hereinunder with reference to FIGS. 3 to 5.

Figure 1:
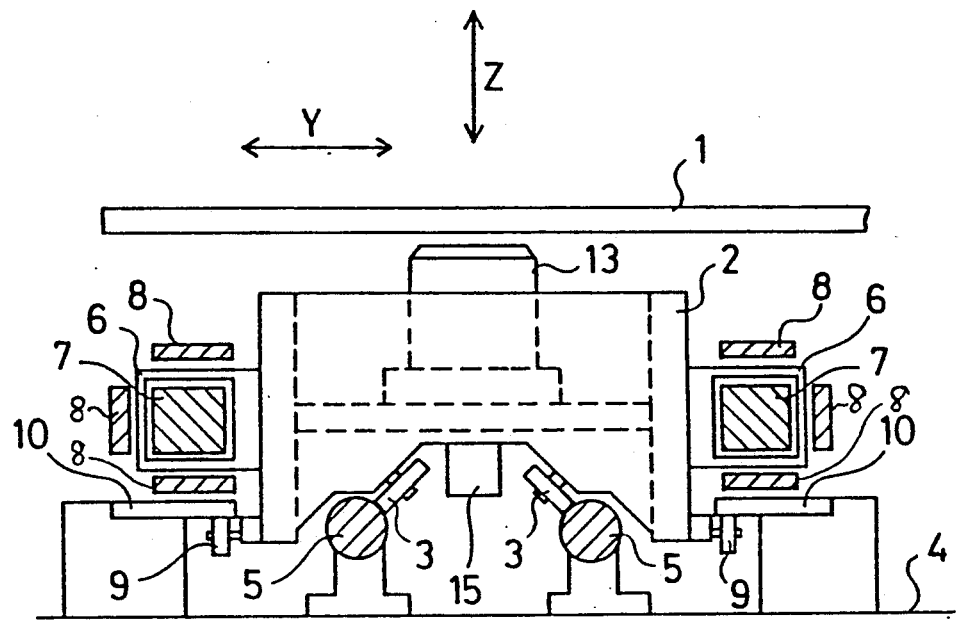
FIG. 1 is a front elevational sectional view of a conventional carriage assembly.
Figure 2:
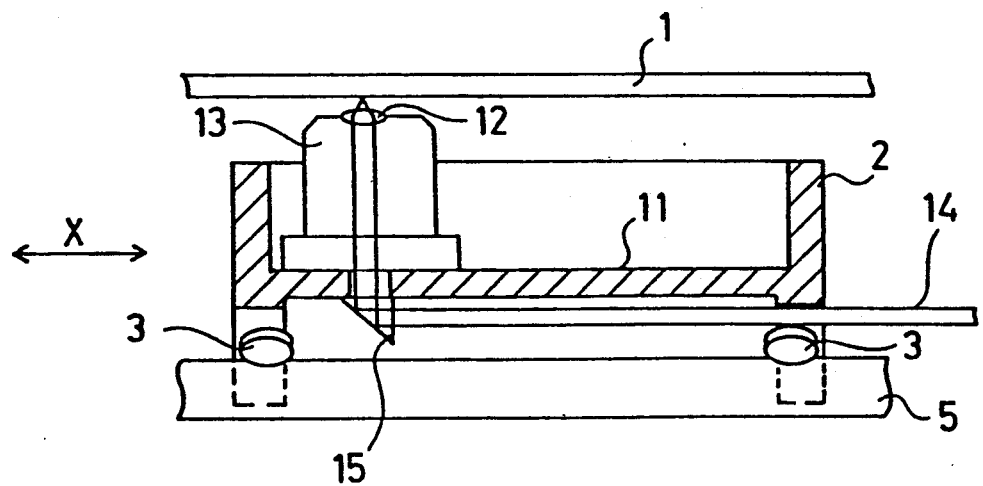
FIG. 2 is a side elevational sectional view of the conventional carriage assembly shown in FIG. 1.
Figure 3:
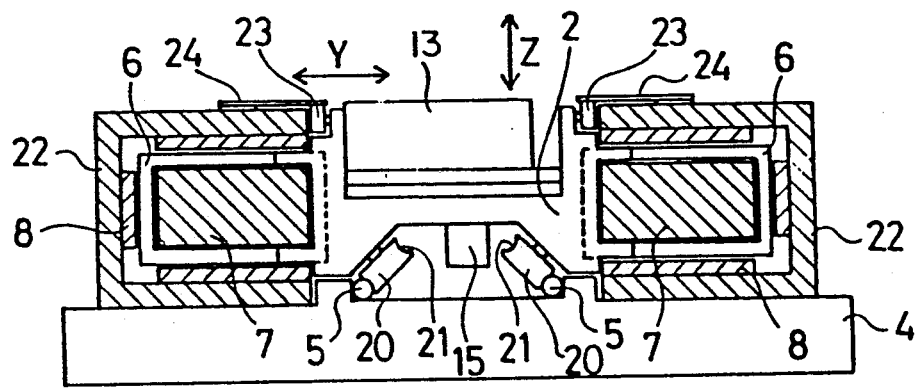
FIG. 3 is a front elevational sectional view of an embodiment of the present invention.

FIG. 3 is a front elevational sectional view of a carriage assembly in accordance with a first embodiment of the present invention. In the figures, the same reference numerals are used to denote the same parts or members as in FIGS. 1 and 2. Referring to these figures, a plurality of first rollers 20 which carry the carriage 2 in, for example, a tripod manner are rotatably arranged around the lower portion of the carriage 2. Each first roller 20 is provided with a peripheral groove 21 which receives an associated guide rail which extends parallel to a radius of the disk and which is fixed to a base 4. With this arrangement, it is possible to prevent the first rollers 20 from slipping in the tangential direction of the guide rail 5.

Second rollers 23 are rotatably secured to both sides of an upper portion of the carriage 2. The second rollers 23 are urged downward by biasing means in the form of guide plates 24 which are, for example, leaf springs secured to the top surface of a magnet assembly 22 provided with magnets 8 arranged on the inner peripheral surface thereof. The magnets 8 cooperate with voice coils 6 and yokes 7 on both side surfaces of the carriage 2 so as to cause a movement of the carriage 2 in the radial direction of the disk 1.

In this arrangement, the upwardly converging first rollers 20 prevent the carriage 2 from moving in the direction of the Y-axis in FIG. 3. At the same time, the movement of the carriage 2 in the direction of the Z-axis is prevented by the guide plates 24 which downwardly urge the second rollers 23, whereby the degree of freedom of movement of the carriage is negated in all directions except for the direction of the X-axis. Any dimensional error or mounting error of the guide rails 5, second rollers 23 and other constituents does not cause any substantial unfavorable effect because the guide plates 24 which are constituted by leaf springs can resiliently pre-load the second rollers 23 with an almost constant force to absorb such an error. In addition, generation of moment on the carriage 2 about the X-axis in which the carriage 2 moves is prevented. Even if a moment is produced, the carriage 2 is prevented from rotating about the X-axis because each guide rail 5 makes point contact at two points on the groove 21, i.e., on both walls of the groove 21 of the first roller so as to resist any tendency which serves to cause the roller 20 to move in the tangential direction of the guide rail 5.

The guide plate 24, which is constituted by a leaf spring in this embodiment, ensures that the urging force on the carriage 2 in the Z-axis direction is maintained substantially constant regardless of the position of the carriage 2 along the X-axis, whereby the carriage 2 is held stably.

Figure 6:
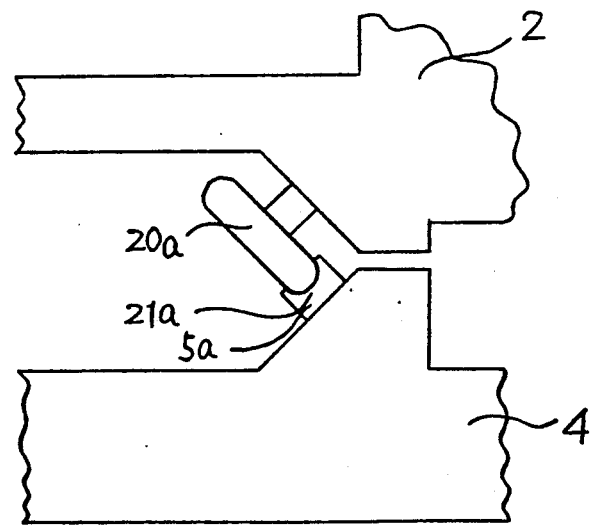
FIG. 6 is an enlarged view of a first roller in another embodiment of the present invention.

Although in the described embodiment the groove 21 is formed in each first bearing 20, this is only illustrative and the arrangement may be such that, as shown in FIG. 6, a groove 21a is formed in each guide rail 5a so as to prevent the associated first roller 20a from slipping in the tangential direction of the guide rail 5a. It will be clear to those skilled in the art that the arrangement shown in FIG. 6 offers the same advantages as those derived from the first embodiment described in connection with FIGS. 3 to 5.

Further modification and change of the described embodiments are possible without departing from the scope of the invention which is limited solely by the appended claims.

What is claimed is:

1. A carriage assembly in an optical disk apparatus comprising:
   a plurality of stationary horizontal guide rails;
   a carriage which is movable on said guide rails;
   a voice coil which is secured to said carriage;
   a stationary magnet which surrounds said voice coil;
   a housing which encompasses said stationary magnet and said voice coil;
   a plurality of first rollers which are rotatably mounted on said carriage and rotatably engaged with said guide rails, and transmit the weight of said carriage to said guide rails;
   a plurality of grooves formed in said first rollers, each of said first rollers engaging with one of said guide rails by means of one of said grooves, whereby said first rollers are prevented from moving tangentially on said guide rails;
   a second roller which is rotatably mounted on an upper portion of said carriage; and
   a leaf spring secured to said housing which is in rolling contact with said second roller and which exerts a downwards elastic biasing force on said second roller in a preload direction z which is perpendicular to the axis of rotation of said second roller, y, and to the direction of motion of said carriage, x;
   said first rollers being positioned at an angle of less than 90° relative to the preload direction z in which the biasing force is exerted; whereby a biasing force having components in the y and z directions is exerted by said first rollers thus restricting slippage of said carriage in the y and z directions.

* * * * *